Figure 3A:
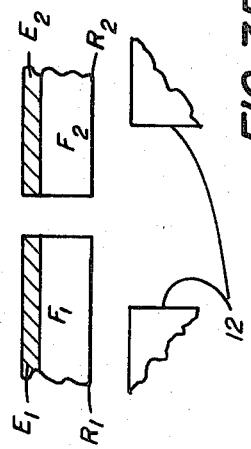
Figure 3B:
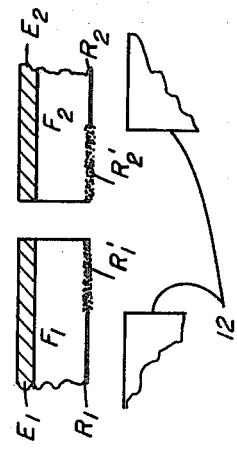
Figure 3C:
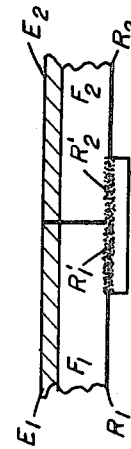
Figure 3D:
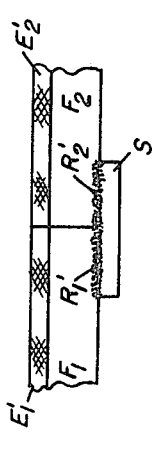

United States Patent
O'Brien

[15] 3,655,473
[45] Apr. 11, 1972

[54] PRE-SPLICE FILM CLEANER
[72] Inventor: Robert J. O'Brien, Rochester, N.Y.
[73] Assignee: Eastman Kodak Company, Rochester, N.Y.
[22] Filed: Oct. 2, 1969
[21] Appl. No.: 863,206

[52] U.S. Cl...............................156/157, 156/272, 156/304, 156/502, 156/380
[51] Int. Cl........................................................B65h 69/06
[58] Field of Search..................156/222, 157, 502, 304, 535, 156/380

[56] References Cited

UNITED STATES PATENTS 2,910,723   11/1959   Trauer...............................156/380 X
3,338,693   8/1967    Letter................................156/272 X Primary Examiner—Carl D. Quarforth
Assistant Examiner—R. E. Schafer
Attorney—Walter O. Hodson and Robert F. Cody

[57] ABSTRACT

Photographic film is conditioned, say for splicing, by means of a brief intense flash of broad band light. The invention is especially useful in making durable splices of pre-processed film: Whereas prior art splicing of pre-processed film is from "emulsion side-to-emulsion side," flashing according to the invention causes the ordinarily hard, and smooth, rem-jet side of pre-processed film not only to be cleaned, but in addition fuses the rem-jet to the film base, and so conditions the rem-jet that it becomes an amorphous matte to which splice material may be secured easily. The rem-jet—except that thereof which was flashed—is dissolved away during film processing.

2 Claims, 6 Drawing Figures

ROBERT J. O'BRIEN
INVENTOR.

ATTORNEYS

PRE-SPLICE FILM CLEANER

BACKGROUND OF THE INVENTION

1. Field of the Invention

This invention relates, generally, to photographic film handling; and more particularly to the splicing together of strips of unprocessed photographic film

2. Description Relative to the Prior Art

Efficient photofinishing procedures require the splicing together—prior to processing—of individual exposed film strips, whereby in effect an endless film web may be developed photographically as part of a continuous processing operation. As is known, photographic film has an emulsion coated side; and a side blackened by what is known as an anti-halation layer, viz. a rem-jet coating: The emulsion side is developed during film processing; and the rem-jet coating is dissolved away during such processing.

Various attempts have heretofore been made to splice together individual film strips by means of splice material secured from the rem-jet side of one film strip to the rem-jet side of another; but such attempts have not provided splices which were sufficiently strong, or sufficiently long lasting. The rem-jet coating is quite hard and smooth, and therefore does not provide a basis for good bonding; and the dissolvability of the rem-jet coating, naturally, has a bearing on the life of the splice. It has, therefore, been the practice of photofinishers to splice from the unprocessed emulsion side of one film strip to the unprocessed emulsion side of another strip.

The trend in photofinishing procedures is toward decreasing the time required for film developing: To accomplish the speed-up of developing, it is usual (among other things) to increase the temperature(s) of the developing solution(s); and it is just such a practice which causes splices made according to the present practice to break. In such "warmed" developing solutions, emulsion material (gelatin) softens, causing emulsion-side splices to give way.

It is also common, in the use of photographic film cartridges, to employ oil to lubricate the parts of such cartridges. The employed oil, while having no adverse influence on the processability of film, frequently gets smeared across such film, and thereby adversely influences the splicing thereof.

As noted above, efficient photofinishing obtains when unprocessed film strips are first spliced into what may be considered an endless web: This means, usually, that unprocessed film is threaded by means of pulleys, etc, through a maze of processing stations; and for a film splice to break in the midst of such a photofinishing operation means, at the least, a horrendous repair job, to say nothing of the fact that it must be carried out in the dark.

The prior art most relevent to the invention may be found in U.S. Pat. Nos. 3,338,693; 3,211,886, and 2,832,985.

SUMMARY OF THE INVENTION

The present invention provides apparatus/methods for conditioning film for splicing thereof. The invention not only provides the first order effect of cleaning film of crud, such as oil and the like; but when employed in its presently preferred way, the invention permits film splicing to be done on the rem-jet side of such film.

An intense, short-duration flash of broad band light energy serves as the vehicle for film cleaning: The intensity is sufficient to vaporize deleterious matter from the film splice area; and the short-duration and wide bandwidth provide, singly and together, the surface treatment of film without dissipating energy through such film; secondly, they assure coaction with the deleterious surface crud without burning through the film, say in the manner of a laser.

It has been found that application of the above-described light flash to the rem-jet side of unprocessed photographic film has the effect not only of making the flashed rem-jet coating roughened and somewhat like an amorphous matte; but also, it has the effect of fusing such roughened rem-jet to the film base material. Thus, when a splice material is applied between the flashed rem-jet side of one unprocessed film strip, and the flashed rem-jet side of another unprocessed film strip, the two strips become securely spliced together; and despite the fact that the rem-jet coating is dissolvable during film processing, the fused portion of such coating which was flashed remains intact, and does not dissolve.

Film splices made in accordance with the teaching of the invention have been known to last (in a processing environment) a matter of days; whereas splices made as is presently the practice in the art last (usually) no more than about 15 minutes.

An object of the invention is to provide improved apparatus/methods for use in handling film.

Another object of the invention is to provide a way to clean film for splicing thereof.

Another object of the invention is to provide a way to condition unprocessed photographic film so that strong splices may be made thereof.

The invention will be described with reference to the Figures, wherein

Figure 1:
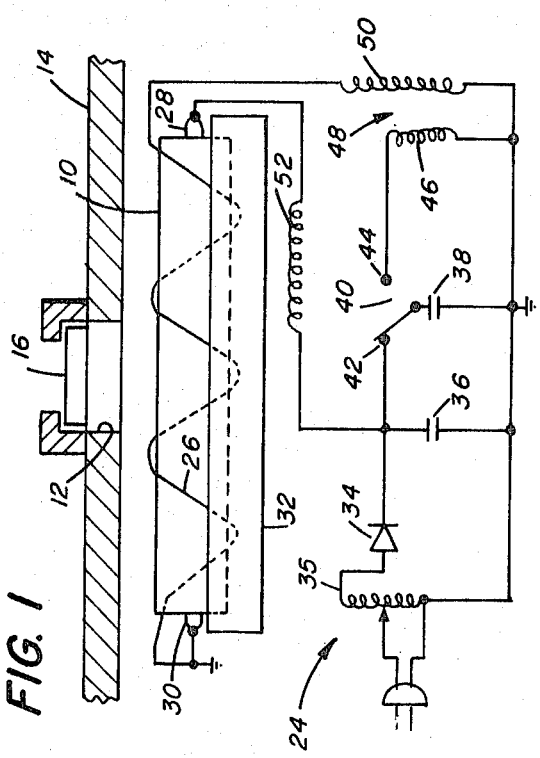
Figure 2:
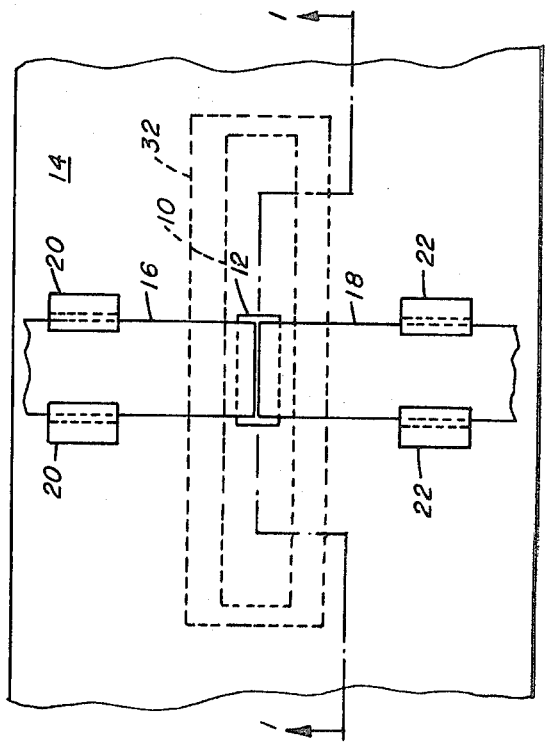

FIG. 1 is a side sectional view schematically illustrating apparatus adapted for practicing the invention, FIG. 2 is a plan view of the apparatus depicted in FIG. 1, and FIGS. 3A–3D are illustrations useful in describing the operation/effect of the invention.

Referring to FIGS. 1,2, a flash lamp 10 is disposed beneath an aperture 12 in a plate 14. The flash lamp 10, as noted above, provides an intense short-duration flash of broad band light to the tips of film webs 16,18 disposed over the aperture 12. The film webs 16,18 are guided into place with respect to the aperture 12 by means of respective guides 20,22; and cover means (not shown) may be employed, as a light seal, over the aperture.

As presently preferred, the flash lamp 10 is in the form of an XE-16-3 Xenon flash lamp, manufactured by PEK Company, 825 East Evelyn Avenue, Sunnyvale, California. The lamp is excited, by means of a circuit 24, to produce a 10 millisecond flash of light—wavelength range preferably from 100 nanometers to 1,100 nanometers—the energy in such flash being in the neighborhood of about 500 joules. The flash lamp 10 has an excitation coil 26 wound therearound for the purpose of triggering the requisite flash; and maintenance of such flash obtains, for the necessary duration, by discharging a current from the anode 28 of the lamp 10 to its cathode 30. A shaped reflector 32 is designed to aim the flash through the aperture 12 to the tips of the film web 16,18.

The circuit 24 causes a rectified voltage 34 of a preselected (variable transformer 35) amount to appear across a pair of capacitors 36,38, the capacitor 38 being excited via a switch 40. When it is desired to flash the lamp 10, the switch 40 is moved from its contact 42 to its contact 44, thereby causing the capacitor 38 to discharge through the primary 46 of a step-up transformer 48. As a result, approximately 30 kv is applied by the transformer secondary 50 to the excitation coil 26 of the lamp 10, thereby causing its (xenon) gas to ionize. Thus, the capacitor 36 sees a flash-producing short circuit to ground via an inductor 52 (which serves to sustain the discharge of the capacitor 36 for the requisite duration); and via the lamp 10.

To appreciate use of the apparatus of the FIGS. 1, 2, as presently preferred, consider FIGS. 3A–3D: In FIG. 3A, the tips of unprocessed, exposed photographic film strips $F_1$ and $F_2$ are disposed over the aperture 12'; the hard, smooth rem-jet sides $R_1$, $R_2$ of such film strips being adapted to receive light flashed through the aperture 12. The high energy flash not only vaporized crud (oil, etc.) off the rem-jet sides of the film strips as noted above, but such flash causes the hard rem-jet coatings $R_1'$, $R_2'$ to become amorphous and matte, and fused to the film strips $F_1$, $F_2$. Thus, when a splice material S (FIGS. 3C) is bonded from the clean flashed rem-jet $R_1'$ of one film strip $F_1$ to the clean flashed rem-jet $R_2'$ of the other film strip $F_2$, a strong durable splice obtains. Film processing to develop ($E_1'$, $E_2'$) the exposed emulsions $E_1$, $E_2$, dissolves away the hard rem-jet coatings $R_1$, $R_2$ (FIG. 3D) but leaves intact the splice material and its supporting conditioned rem-jet base ($R_1'$, $R_2'$).

The invention has been described in detail with particular reference to preferred embodiments thereof, but it will be understood that variations and modifications can be effected within the spirit and scope of the invention.

What is claimed is:

1. The method of splicing strips of exposed, undeveloped photographic film comprising the steps of:
   a. flashing at least a part of the anti-halation side of each of said film strips with intense radiation sufficient to cause said anti-halation parts to become amorphously matte and to fuse said anti-halation parts to said film strips,
   b. positioning the anti-halation parts of said film strip in proximate relationship, and
   c. bonding said film strips together by applying a splicing material between the flashed antihalation side of one film strip and the flashed antihalation side of the other film strip.

2. The method of claim 1 wherein said flashing is by means of broad band light.

* * * * *